Patented Oct. 5, 1926.

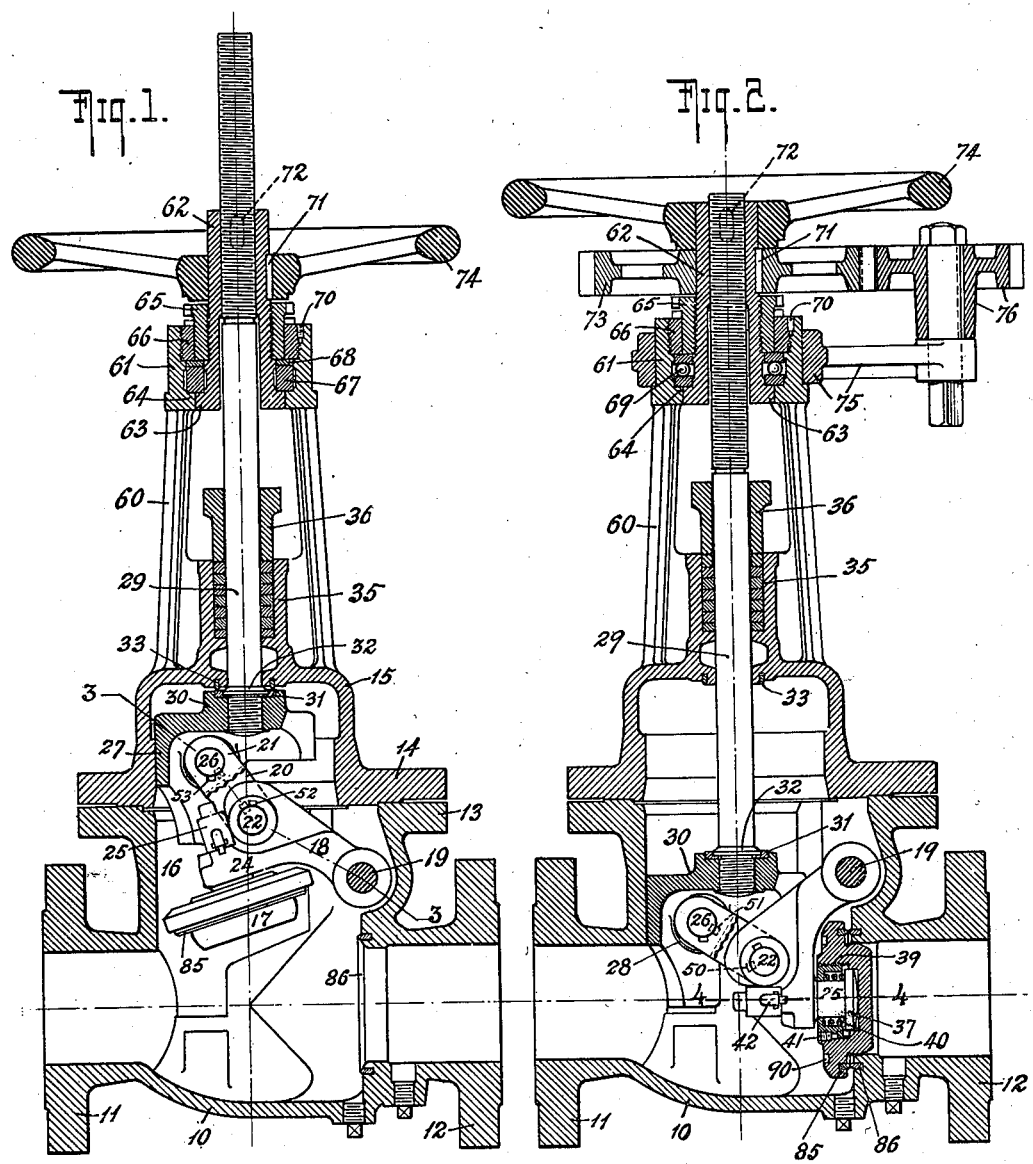

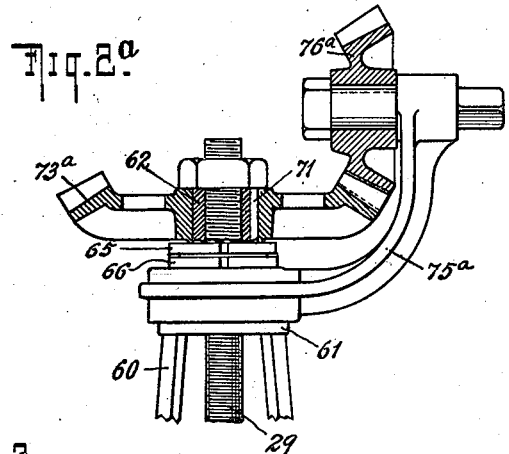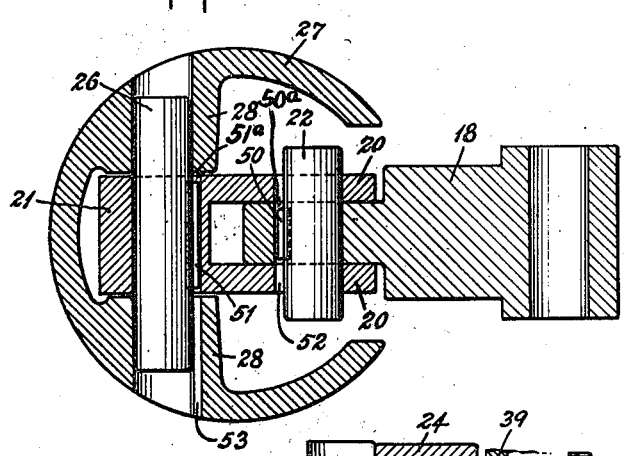

1,602,236

UNITED STATES PATENT OFFICE.

KARL MARSCHEIDER, OF BERLIN-TEGEL, AND ARTHUR SALINGRÉ, OF BERLIN, GERMANY, ASSIGNORS TO A. BORSIG, G. M. B. H., OF BERLIN-TEGEL, GERMANY, A GERMAN CORPORATION.

VALVE.

Application filed June 20, 1924, Serial No. 721,171, and in Germany April 30, 1924.

This invention relates to valves and considered from the standpoint of certain of its principles relates more particularly to that type of valve known as swinging disc valves.

It is the principal object of this invention to provide a valve of new and improved construction which will give a maximum of service and efficiency under the most severe and exacting hard usage, which may be readily interchanged for either manual or power actuation and which is provided with various safety devices to prevent accidental disconnection of the actuating parts and to insure the proper alignment and seating of the valve seating surfaces.

In the drawings forming a part hereof in which an example of our invention is shown without defining its limits, Fig. 1 is a central sectional view showing the valve in open position and provided with a friction bearing and hand wheel; Fig. 2 is a view similar to Fig. 1 showing the valve provided with an actuating gear and an interchangeable ball bearing, the valve disc being shown in closed position; Fig. 2ª is a partial front view of a different form of gearing and bracket therefor; Fig. 3 is a sectional detail taken on the line 3—3 of Fig. 1; Fig. 4 is a section on the line 4—4 of Fig. 2; Fig. 5 is an end view of the structure shown in Fig. 4; Fig. 6 is a detail of the locking piece shown in Fig. 5 and Fig. 7 is an enlarged detail showing the configuration of the engaging surfaces of the valve disc and casing, and Fig. 8 is a central section similar to Figs. 1 and 2 showing the manner of regrinding the contacting surfaces of the valve disc and valve casing.

The numeral 10 indicates the main casing of the valve which is provided in accordance with the usual constructions of devices of the character with the flanged inlet 12 and outlet 11 for connecting the valve to the usual pipe lines. The upper open end of the casing 10 is surrounded by an annular flange 13 to which is bolted a casting 14 having a cup-shaped bonnet 15 at its lower end, which defines with the main casing 10, a chamber 16 in which the link mechanism for supporting the valve disc 17 is mounted.

For the purpose of clarity of description the various parts of the valve construction will be described under the following headings:

A, Link mechanism for supporting and actuating the valve disc; B, Means for preventing leakage past valve actuating rod; C, Connection of valve disc to linking mechanism and locking means therefor; D, Means for preventing accidental disconnection of link mechanism; E, Interchangeable means for actuating the link mechanism and valve, and bearings therefor; F, Special configuration of valve disc and valve casing surfaces; G, Valve regrinding means.

A. Link mechanism for supporting and actuating the valve disc.

The valve disc 17 is supported for swinging movement within the chamber 16 upon a supporting arm or link 18 pivotally connected by a pivot pin 19 to the casing, the axis of which pivot pin is the center of revolution for the swinging movement of the valve from the open position shown in Fig. 1 to the closed position shown in Fig. 2. The end of arm 18 removed from the pivot pin is reduced and flattened and fits between the arms 20, of a yoke-shaped link 21; said link and arm being pivotally connected together by a pintle 22. The supporting arm or link 18 is provided at a point between its extremities with an apertured boss 24 which projects laterally from and at an angle to said arm. A pressure bolt 25 is received within said apertured boss and serves to connect the valve disc to the link mechanism as will hereinafter be more fully described.

The yoke shaped link 21 has its upper end pivotally connected by any suitable means such as the pintle 26 to a slide 27 which as shown in Fig. 3 is substantially C shaped in horizontal cross section and is adapted to slide within the chamber 16. The slide 27 is provided with a pair of inwardly extending, aligned, apertured bosses 28 in which the pintle 26 is rotatably mounted, and said slide is supported within the chamber 16 by the lower end of the valve actuating rod or spindle 29. The lower end of valve rod 29 is threaded to engage within a screw-threaded hole provided in a horizontally extending web 30 formed integral with the slide 27 and said valve rod is preferably riveted over after being screwed home in the web 30 to hold the rod and slide securely connected.

B. Means for preventing leakage past valve actuating rod.

The upper face of the web 30 is counterbored concentrically of the screw threaded aperture for the valve rod 29 to provide a recess in which a ring 31, preferably of a non-corrosive nickel alloy is seated, and said ring is securely held or embedded within its recess by an annular flange 32 formed on said valve rod. The upper face of said ring 31 is a plane surface and is adapted to contact with a similar surface of a cooperating ring 33 also constructed of non-corrosive material and pressed or rolled into an annular groove formed in the lower face of the cup shaped bonnet 15 of the casting 14. The plane surfaces of the rings 31 and 33 are preferably ground to form a fluid tight joint which prevents the full pressure of the fluid passing through the valve casing from being exerted against the packing contained in the stuffing box 35, when the valve is in the full opened position shown in Fig. 1. The stuffing box 35 which as shown is formed integral with the casting 14, may be of any well known construction and may contain any of the usual packing substances held within the stuffing box by any suitable means such as the gland 36.

C. Connection of valve disc to linking mechanism and locking means therefor.

The inner face of the valve disc 17 is provided with a cylindrical recess in which the enlarged head 37 of the pressure bolt 25 is received and said recess is screw threaded to receive a cup-shaped nut 39. The inner end of the cup-shaped nut terminates short of the enlarged head 37 to provide clearance for a limited oscillation of the disc 17 upon the pressure bolt. An expansion spring 40 is confined between the nut 39 and head 37 and serves to hold the disc firmly against the rounded outer face of the bolt head 37, but permits rotation of the disc upon said bolt. After the nut 39 has been screwed into position upon the disc 17 it is locked against rotation by means of the locking screw 41.

That portion of the pressure bolt about which the spring 40 is coiled is of larger diameter than the remainder of the bolt to provide a shoulder, which is held firmly against the apertured boss 24 of the supporting arm, by means of a tapered key 42, which passes through a suitable slot extending diametrically of the pressure bolt. Means are provided for locking the key 42 against accidental displacement and such means, as shown in Figs. 4 to 6 inclusive, consists of a specially formed slot 43, provided in the narrow end of the key 42, in which the locking member 44 is adapted to be engaged. The locking member 44, as shown in Fig. 6, has a shank portion 45, and a pair of laterally extending wings 46 at one end, said end through the wings being of greater width than the key 42. After the key 42 has been driven home, the locking member is bent backwardly upon itself and is inserted into the slot 43, after which the shank portion is bent about the outer periphery of the boss 24. While the frictional engagement of the tapered key 42 with the wall of its slot and with the top face of the boss 24, will in most cases be sufficient to prevent the key from becoming loosened, the engagement of the shank portion 45 of the locking member will serve as an added security. As the end of the locking member having the wings 46 is wider than the key slot, even in the improbable event of the shank 45 becoming straightened so as to permit the key 42 to move outwardly of its slot, the key will be prevented by said wings from falling entirely out of the pressure bolt.

D. Means for preventing accidental disconnection of link mechanism.

In order to prevent the pivot pins 22 and 26 from becoming accidentally disconnected, said pins have secured thereto the keys or projections 50 and 51 respectively; which keys are preferably secured by spot welding within suitable keyways provided in the pins, although any equivalent securing means could obviously be substituted. It will be noted that the keys 50 and 51 are located substantially midway of their respective pins, and that when the parts are in the assembled position shown in Fig. 3 the key 50 of the pin 22 lies within a keyway 50ª cut in the arm 18 and between the arms 20 of the yoke-shaped link 21, while the key 51 of pin 26 lies within a keyway 51ª of the link 21 and between the opposed faces of the bosses 28. In order to permit the pins 22 and 26 to be placed in position, the arms 20 of the link 21 and one of the bosses 28 are provided with the keyways or clearance spaces 52 and 53 respectively. The keyways 50ª and 51ª are so located, as shown by the full line positions of the valve actuating parts in Figs. 1 and 2, that the keys 50 and 51 can not be brought into alignment with their respective keyways 52 and 53 in the ordinary operation of the valve. When the casting 14 is disconnected from the main casing 10 it becomes possible to move the links, so that the keyways 50ª and 51ª will be brought into alignment with the keyways 52 and 53 respectively, thus bringing the keys 50 and 51 into alignment with the latter keyways and permitting the removal of the pins 22 and 26.

E. Interchangeable means for actuating link mechanism and valve.

The casting 14 has formed, preferably integral therewith, a yoke 60, the upper end of which is formed into a cylindrical hollow casing or head piece 61 in which the spindle nut 62 is received. The nut 62 is screw-threaded to receive the cooperating screw-threaded upper end of the actuating spindle 29 and said nut is provided at its lower end with a flange or shoulder 63. The head piece 61 is provided with an inner flange 64 and said flanges 63, 64 cooperate with the nuts 65, 66, screwed respectively upon the outer circumference of the spindle nut 62 and the inner circumference of the head piece 61, to form a bearing cage in which the friction bearing 67 and washer 68, as shown in Fig. 1, or the ball bearing 69, as shown in Fig. 2, may be interchangeably received. It will be noted that the combined outer dimensions of the friction bearing 67 and washer 68 are the same as the outer dimensions of the ball bearing 69, and that the spindle nut and head piece are each provided with a shoulder against which the nuts 65 and 66 are seated; said shoulders being so located as to prevent said nuts from binding the bearings while preventing longitudinal lost motion of the spindle nut. Nut 66 is preferably locked in position by the screw 70. The upper end of the spindle nut 62 projects outwardly beyond the nuts 65, 66 and head piece 61 and is provided with a pair of keyways 71, 72, preferably arranged at right angles to each other, and which keyways serve to secure the gear wheel 73 and hand wheel 74 non-rotatably to the spindle nut. If desired, both a gear wheel and hand wheel may be secured to the spindle nut, as shown in Fig. 2 or if for any reason it is not feasible to employ both mechanical and manual means for actuating the valve, the hand wheel only, as shown in Fig. 1, or a gear wheel only, may be interchangeably mounted and keyed upon the spindle nut. The outer circumference of the cylindrical head piece 61 is machined to receive a bracket 75 which carries a pinion 76 for driving the gear. The bracket may be of the type shown in Fig. 2 for spur gearing where the power shaft is parallel with the valve spindle or the bracket 75ª as shown in Fig. 2ª may be employed where bevel gears must be used.

F. Special configuration of the valve disc and valve casing surface.

The inlet 12 of the valve adjacent to the chamber 16 is provided with a gradually decreasing counter-bore 80 which, in the example shown, takes the form of a conical or tapering surface, although any equivalent configuration could be employed. The projecting teat 81 of the valve disc is curved as more clearly shown in Fig. 7 to provide a re-entrant recess or groove 82 and merges gradually into a wider portion 83 and is then rounded off quite sharply at the outer edge of the teat. The wider portion 83, it will be noted, is dimensioned to fit neatly within the bore of the inlet and extends to a point just at, or slightly beyond, the termination of the conical counter-bore 80 when the disc 17 is seated. The outer rounded edge of the teat and the gradually decreasing counter-bore cooperate to cause the disc to enter the bore of the inlet 12 without jamming and thereby prevent any chipping or breaking of the valve disc or casing, while the engagement of the wider portion 83 with the wall of the bore of the inlet insures the perfect alignment of the packing rings 85, 86, suitably secured to the disc and casing respectively. The re-entrant groove 82 serves to produce a venturi effect upon the fluid passing through the valve when it is only partially opened, thereby preventing the rapid erosion of the disc which would otherwise ocur if steam or other fluids under high pressure impinged directly upon the disc and exit mouth of the bore.

G. Valve regrinding means (Fig. 8).

For convenience in regrinding the packing rings 85, 86, which preferably are of non-corrosive alloy, the inner face of the valve disc is provided with a plurality of apertures 90, in one or a pair of which, one or a pair of pins 91 provided on the bent inner end of a valve grinding spanner wrench 92 is adapted to be engaged. The casing 10 is provided with an inwardly extending web 93 against which the shank or handle of the spanner engages, and said spanner is forced against the outer end of the pressure bolt as the valve disc is rotated to exert the necessary pressure to insure the rapid and effective grinding of the valve.

Operation.

The operation of the valve will be readily understood, rotation of the spindle nut 62 in the proper direction causing the spindle 29 and slide 27 to be moved upwardly or downwardly as desired. The slide 27 is held against rotation by its connection with the link mechanism. Assuming that the spindle nut is rotated in a direction to move the spindle and slide downwardly it will be obvious that the yoke-shaped link 21 will swing the supporting arm 18 upon its pivot pin 19 and cause the disc to be moved to its closed position, shown in Fig. 2; the pressure of the arm holding the packing rings 85, 86 in tightly contacting engagement to form a fluid tight joint, and the yielding connection of the pressure bolt allowing the valve disc to adjust itself. When the valve is fully opened, as shown in Fig. 1, little if any of the pressure of the fluid passing through the valve will be exerted against the packing of the stuffing box, due to the provision of the packing rings 31, 33, thereby avoiding the frequent necessity of replenishing or renewing the stuffing box packing.

The manner in which the gear and hand wheel as well as the bearings may be interchanged has been hereinbefore described, likewise the manner in which the special configuration of the valve disc and valve casing surfaces function.

It will be understood that the principles of construction hereinbefore described are applicable to many types of swinging disc valves and that such features as for example the interchangeable hand wheel and gear and the interchangeable bearings for the spindle are of general application to valves of any type. It will be also understood that many changes, variations and modifications of the specific construction herein described and illustrated may also be resorted to without departing from the spirit of our invention.

We claim:

1. A swinging disc valve having a plurality of pivotally connected members to actuate the valve disc and a plurality of pivot pins for connecting said members, characterized by the provision of retaining devices secured to said pivot pins and cooperating with said members to prevent any disconnection of said members in any of the positions to which said members are moved in the normal operation of said valve.

2. A swinging disc valve as set forth in claim 1, in which said members are provided with clearance spaces to permit disconnection of said pivot pins and members when said members are moved beyond their normal limits of movement.

3. A swinging disc valve comprising a valve disc, actuating mechanism to swing said disc, a pressure bolt for connecting said disc to said mechanism, a key to secure said pressure bolt in position and a locking member secured to said key to prevent accidental disconnection of said key.

4. A swinging disc valve comprising a valve disc, actuating mechanism to swing said disc, a pressure bolt for connecting said disc to said mechanism, a key to secure said pressure bolt in position and a locking member secured to said key to prevent accidental disconnection of said key, said locking member having a bendable shank portion bent into engagement with a portion of said actuating mechanism to hold said key securely in position.

5. A swinging disc valve comprising a valve disc, actuating mechanism to swing said disc, a pressure bolt for connecting said disc to said mechanism, a key to secure said pressure bolt in position and a locking member secured to said key to prevent accidental disconnection of said key, said locking member having a portion thereof extending beyond the side edges of said key to prevent said key from becoming entirely disconnected from said pressure bolt.

6. A swinging disc valve comprising a valve disc, actuating mechanism to swing said disc, a pressure bolt for connecting said disc to said mechanism, a key to secure said pressure bolt in position and a locking member secured to said key to prevent accidental disconnection of said key, said locking member having a bendable shank portion bent into engagement with a portion of said actuating mechanism to hold said key securely in position, and said locking member being further provided with a portion extending beyond the side edges of said key to prevent said key from becoming entirely disconnected from said pressure bolt if said shank portion should become disengaged from said actuating mechanism.

7. In a valve, a casing, a valve actuating spindle, a stuffing box and packing therefor, a pair of annular metal rings constructed of a hard non-corrosive material, one of said rings being within said casing adjacent to said stuffing box and firmly embedded within a mass of the casing material surrounding the spindle, and the other of said rings being firmly embedded within a mass of material surrounding said spindle, said rings being provided with cooperating plane surfaces ground to provide a fluid tight joint.

8. In a valve, a hollow cylindrical head piece, a nut, to which a gear is adapted to be secured mounted within said head piece, a spindle threaded in said nut, said nut and spindle being rotatable relatively to one another, and said head piece having the outer periphery thereof machined to provide a means for securing a bracket removably to said valve, said bracket being provided with a gear arranged in meshing engagement with said first named gear.

9. The combination with a valve outfit adapted for heavy duty and provided with means for manual or power operation, said valve having a hollow cylindrical head piece, and a valve actuating member rotatably mounted within said head piece, said head piece forming a bearing cage, of a friction bearing and a ball bearing, said bearings having the same outer dimensions so that each is adapted to be interchangeably received within said bearing cage, a nut for holding said bearings detachably within said cage, and a shoulder in said head piece for preventing said nut from being clamped tightly against said bearings.

10. In a valve, a casing, a swinging disc valve having a projecting cylindrical teat, the outer periphery of which is curved to provide a re-entrant groove, a rounded outer edge and a wider portion between said groove and outer edge and said casing being provided with a counterbore in the passageway of the valve of gradually decreasing diameter in which said teat is adapted to engage.

11. In a valve, a casing, a valve actuating spindle, a stuffing box and packing therefor, a pair of annular metal rings constructed of a hard non-corrosive material surrounding said spindle, one of said rings being firmly embedded within a mass of the casing material and the other of said rings being firmly embedded within a casting secured to the lower end of said spindle, said rings being provided with cooperating plane surfaces ground to provide a fluid tight joint, one of said rings having a wide seating surface and the other of said rings having a relatively small seating surface.

12. In a valve, a hollow cylindrical head piece, a nut member mounted within said head piece and a spindle member having a screw-threaded portion mounted in said nut, said members being rotatable relatively to one another, one of said members being constructed for the attachment of a gear thereto and said head piece being provided with an annular machined bearing surface encircling said spindle and a bracket having a machined bearing surface in engagement with said first named bearing surface and secured to said head piece, said bracket being provided with driving means including a gear arranged in meshing engagement with said first named gear.

13. In a valve, a hollow cylindrical head piece, a nut member mounted within said head piece, a spindle member having a screw-threaded portion mounted in said nut, said members being rotatable relatively to one another, one of said members being constructed for the attachment of a gear thereto, said head piece being provided with a bearing surface arranged concentrically of said spindle and a bracket, having a machined bearing surface in engagement with said concentric bearing surface and secured to said head piece, said bracket having mounted thereon driving means including a gear arranged in meshing engagement with said first named gear.

14. In a valve, a casing, a swinging disc valve having a projecting teat, a rounded outer edge on said teat and a wider portion adjacent to said rounded outer edge, and said casing being provided with a counter bore in the passageway of the valve of gradually decreasing diameter said teat adapted to engage the wall of said counterbore at its smallest diameter.

15. In a valve, a casing, a bonnet secured to said casing, a swinging valve disc, a plurality of pivotally connected members to actuate said disc, a plurality of pivot pins on which said members are mounted, and retaining devices fixedly secured to said pins for preventing any disconnection of said members from each other in any of the positions to which said members are moved in the normal operation of said valve, and permitting disconnection of said members only when said bonnet is disconnected.

16. In a valve, a casing having a bonnet detachably secured thereto, a swinging valve disc mounted in said casing, a valve actuating spindle mounted in said bonnet and means for connecting said spindle and disc comprising a plurality of pivotally connected members, detachable pivot pins for connecting said members, retaining devices secured to said pivot pins and a plurality of said members being provided with slots for said retaining devices, the slot for each retaining device being movable into alignment therewith to permit the passage therethrough of said retaining device and removal of said pins only when said bonnet is detached from said casing.

17. In a valve, a casing, a bonnet secured to said casing, a slide member within said bonnet, a swinging valve disc, a plurality of pivotally connected links to actuate said disc, a plurality of pivot pins for connecting said slide member and said links, and retaining members fixedly secured to said pins for preventing any disconnection of said links from said slide member or from each other in any of the positions to which said links are moved in the normal operation of said valve, and permitting disconnection of said sliding member and said links only when said bonnet is disconnected.

18. In a valve, a casing having a bonnet detachably secured thereto, a swinging valve disc mounted in said casing, a valve actuating spindle mounted in said bonnet and means for connecting said spindle and disc comprising a plurality of pivotally connected members, detachable pivot pins for connecting said members, retaining devices secured to said pivot pins and a plurality of said members being provided with slots for said retaining devices, the slot for each retaining device being movable into alignment therewith to permit the passage therethrough of said retaining device and removal of said pins only when said bonnet is detached from said casing, and said devices being of such length and so located upon said pivot pins that they will engage within said slots to prevent the pivotal movement of said members when said pivot pins are not located in their proper operating position, while when said pins are located in their proper operating position, said devices will permit pivotal movement of said members.

19. In a valve, casing, a bonnet detachably secured to said casing, a valve disc mounted in said casing, a valve actuating spindle mounted in said bonnet, and means for operatively connecting said spindle and valve disc comprising a slide member associated with said valve, an arm associated with said valve disc, a link in engagement with said arm and slide member, a pair of pivot pins for pivotally connecting said link with said slide member and arm, a retaining key secured to each of said pivot pins, said slide member, arm and said link being provided with a plurality of keyways arranged to form a cooperating pair for each of said retaining keys, one member of each pair of keyways being located out of alignment with its companion keyway when said bonnet is in operative position on said casing, and being movable into alignment only when said bonnet is detached from said casing.

In testimony whereof we have hereunto set our hands.

KARL MARSCHEIDER.
ARTHUR SALINGRÉ.